US011153420B2

(12) United States Patent
Ranpise et al.

(10) Patent No.: US 11,153,420 B2
(45) Date of Patent: Oct. 19, 2021

(54) NEIGHBOR EQUIVALENCE GROUPS

(71) Applicant: Arista Networks, Inc., Santa Clara, CA (US)

(72) Inventors: Amit Ranpise, San Jose, CA (US); Rajesh Semwal, Sunnyvale, CA (US); Nitin Singh, Fremont, CA (US); Madhu Sudan, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 74 days.

(21) Appl. No.: 16/657,885

(22) Filed: Oct. 18, 2019

(65) Prior Publication Data

US 2021/0120109 A1    Apr. 22, 2021

(51) Int. Cl.
| | |
|---|---|
| *H04L 12/715* | (2013.01) |
| *H04L 12/741* | (2013.01) |
| *H04L 29/08* | (2006.01) |
| *H04L 12/66* | (2006.01) |
| *G06F 16/23* | (2019.01) |
| *G06F 16/28* | (2019.01) |
| *H04L 12/751* | (2013.01) |

(52) U.S. Cl.
CPC ........ *H04L 69/324* (2013.01); *G06F 16/2379* (2019.01); *G06F 16/285* (2019.01); *H04L 12/66* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 9,722,910 | B2 * | 8/2017 | Yang | H04L 12/66 |
| 10,116,593 | B1 * | 10/2018 | Sinn | H04L 49/70 |
| 10,419,328 | B1 | 9/2019 | Dave | |
| 10,630,509 | B2 * | 4/2020 | Bickhart | H04L 41/0213 |
| 10,917,330 | B1 * | 2/2021 | Szarecki | H04L 45/04 |
| 10,917,334 | B1 * | 2/2021 | Lamanna | H04L 45/02 |
| 2002/0165981 | A1 | 11/2002 | Basturk et al. | |
| 2006/0291446 | A1 | 12/2006 | Caldwell et al. | |

(Continued)

OTHER PUBLICATIONS

International Search Report and Written Opinion for International Application No. PCT/US20/56153 dated Jan. 21, 2021, 19 pages.

*Primary Examiner* — Ajit Patel
(74) *Attorney, Agent, or Firm* — Fountainhead Law Group P.C.

(57) ABSTRACT

Techniques for implementing neighbor equivalence groups on a network device are provided, where a neighbor equivalence group is a group of peers of the network device that communicate identical control plane state information for a given network protocol to the network device. In the context of Border Gateway Protocol (BGP), these techniques can include (1) creating, by the network device, a neighbor equivalence group for a set of BGP peers that advertise the same BGP paths to the device, (2) maintaining, by the network device, a single path database for the neighbor equivalence group (rather than one path database for each BGP peer in the group), and (3) immediately processing by the network device, BGP path update/withdrawal messages received from any of the BGP peers in the group against the single path database, without waiting for the same message to be received from every peer.

20 Claims, 9 Drawing Sheets

(56) References Cited

U.S. PATENT DOCUMENTS

| | | | |
|---|---|---|---|
| 2007/0104106 A1* | 5/2007 | Patel | H04L 45/04 |
| | | | 370/238 |
| 2012/0158976 A1* | 6/2012 | Van der Merwe | H04L 45/02 |
| | | | 709/228 |
| 2013/0121336 A1 | 5/2013 | Hemige et al. | |
| 2014/0003227 A1 | 1/2014 | Scudder et al. | |
| 2015/0200838 A1* | 7/2015 | Nadeau | H04B 10/27 |
| | | | 398/58 |
| 2015/0263946 A1* | 9/2015 | Tubaltsev | H04L 49/354 |
| | | | 370/392 |
| 2015/0312055 A1* | 10/2015 | Varga | H04L 12/4633 |
| | | | 370/254 |
| 2015/0334000 A1* | 11/2015 | Zhang | H04L 45/22 |
| | | | 370/254 |
| 2016/0119156 A1 | 4/2016 | Drake et al. | |
| 2016/0248658 A1* | 8/2016 | Patel | H04L 45/127 |
| 2016/0294612 A1 | 10/2016 | Ravinoothala et al. | |
| 2017/0054628 A1* | 2/2017 | Tomotaki | H04L 12/4633 |
| 2017/0104666 A1 | 4/2017 | Semwal et al. | |
| 2018/0227212 A1* | 8/2018 | Ferguson | H04L 12/4625 |
| 2018/0367401 A1 | 12/2018 | Harneja et al. | |
| 2019/0363975 A1* | 11/2019 | Djernaes | H04L 45/24 |
| 2020/0235990 A1* | 7/2020 | Janakiraman | H04L 41/0816 |
| 2021/0037052 A1* | 2/2021 | Camp | H04L 63/1425 |

* cited by examiner

NEIGHBOR EQUIVALENCE GROUPS

BACKGROUND

Border Gateway Protocol (BGP) is a networking protocol that enables the routing of network traffic within and across autonomous systems (i.e., independently operated networks) on the Internet. Network devices that implement BGP, known as BGP speakers, are configured to establish peering sessions with other BGP speakers and to exchange routing information with those device(s). For example, a BGP speaker S1 at the edge of an autonomous system AS1 may establish a first peering session with a BGP speaker S2 at the edge of an autonomous system AS2 and a second peering session with a BGP speaker S3 at the edge of an autonomous system AS3. In this scenario, S2 and S3 are considered BGP peers (or neighbors) of S1 by virtue of the established sessions. Once connected in this manner, BGP speaker S1 can advertise network routes, referred to as BGP paths, for destination addresses that S1 is aware of (e.g., destination addresses within or accessible via AS1) to BGP peers S2 and S3 respectively. BGP speaker S1 can also receive BGP paths pertaining to, e.g., AS2 and AS3 from BGP peers S2 and S3. Each BGP speaker can then use the paths that it has received to populate its next-hop forwarding table and route incoming traffic accordingly.

In conventional BGP control plane implementations, a BGP speaker creates and maintains a separate path database for each BGP peer it is connected to for the purpose of storing the BGP paths received from that peer. For instance, in the example above, BGP speaker S1 will create and maintain a first path database for storing BGP paths it receives from BGP peer S2 and a second path database for storing BGP paths it receives from BGP peer S3. While this approach works well in relatively small and uncomplicated network topologies, it can cause scaling issues in larger and/or more complex topologies.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing neighbor equivalence groups on a network device, where a "neighbor equivalence group" is a group of peers of the network device that communicate identical control plane state information for a given network protocol to the network device (and thus are considered "equivalent" in that respect from the network device's perspective). In the context of BGP, these techniques can include (1) creating, by the network device, a neighbor equivalence group for a set of BGP peers that advertise the same BGP paths to the device, (2) maintaining, by the network device, a single path database for the neighbor equivalence group (rather than one path database for each BGP peer in the group), and (3) immediately processing by the network device, BGP path update/withdrawal messages received from any of the BGP peers in the group against the single path database, without waiting for the same message to be received from every peer. With this general approach, the memory and compute overhead of the BGP control plane running on the network device, as well as the convergence time for BGP path updates/withdrawals, can be advantageously reduced.

It should be noted that while various examples and embodiments described herein focus on the implementation of neighbor equivalence groups with respect to BGP, the same principles may be applied to other networking protocols that exhibit certain characteristics similar to BGP. For example, the techniques of the present disclosure may be used to implement neighbor equivalence groups with respect to any standardized or proprietary networking protocol that involves (1) the receipt of duplicate control plane state information by a network device from two or more peers, and (2) the creation/maintenance of separate, per-peer databases on the network device for storing the control plane state received from each peer. Accordingly, all references to BGP in the present disclosure may be interchangeably replaced with references to such other networking protocols.

2. Example Topology

Figure 1:
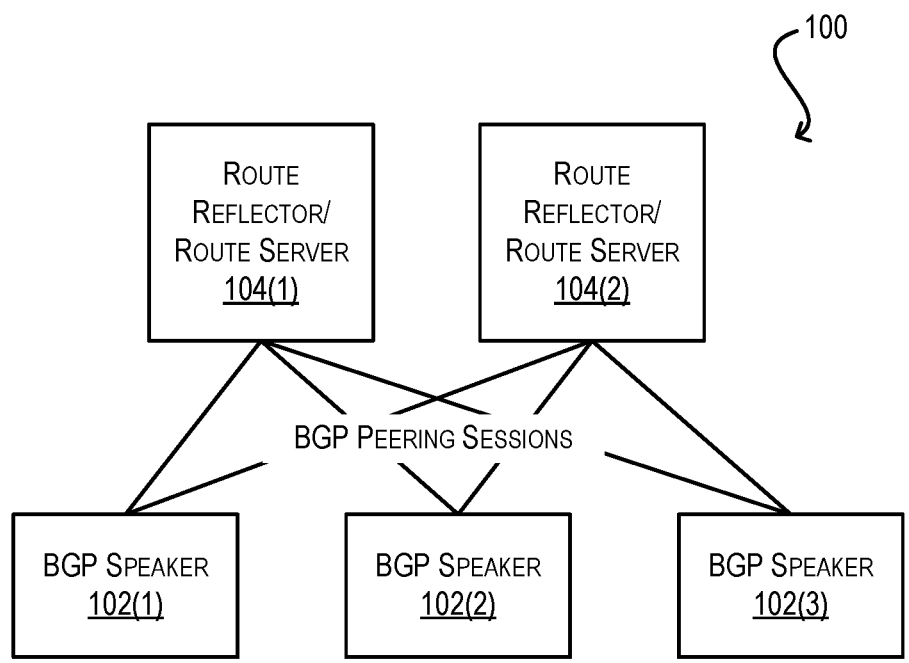
FIG. 1 depicts an example network topology according to certain embodiments.

FIG. 1 is a block diagram of an example network topology 100 in which embodiments of the present disclosure may be implemented. As shown, topology 100 includes three BGP speakers 102(1)-(3) (which may be, e.g., network switches or routers) that are communicatively coupled via peering sessions with two route reflectors (RRs)/route servers (RSs) 104(1) and 104(2). Thus, for each BGP speaker 102, RR/RS 104(1) and RR/RS 104(2) are BGP peers of that device. Although exactly three BGP speakers and two RRs/RSs are depicted for purposes of illustration, any number of these entities may be supported.

In the context of BGP, a route reflector (RR) or route server (RS) is a device that consolidates and mediates the exchange of BGP paths between BGP speakers to which it is connected (known as client BGP speakers). Among other things, this avoids the need for a full mesh topology among the client BGP speakers in order for the speakers to advertise (or in other words, communicate) BGP paths to each other; instead, each client BGP speaker can send its BGP paths to the RR/RS, which in turn can forward the paths to the other client BGP speakers. It should be noted that an RR/RS is itself a BGP speaker and thus can act as a client of other RRs/RSs that are capable of consolidating and forwarding BGP paths advertised by the RR/RS. In addition, a RR/RS is typically a control plane-only device (i.e., a device that only receives/transmits network control plane information) and thus does not participate in the routing of data traffic within topology 100.

A BGP path is a data structure/object comprising a mapping between an address prefix (e.g., 10.0.0.1/16, 2001:: 01/64) and a next hop address, along with certain other attributes such as origin type, AS (autonomous system) path length, and so on. The next-hop address is the location to which a network packet destined for an address within the scope of the address prefix may be forwarded in order to reach its destination. Generally speaking, BGP speakers advertise/communicate BGP paths to each other in the form of BGP path update messages and BGP path withdrawal messages. A BGP path update message identifies a new or updated BGP path to be recorded by a receiving BGP speaker while a BGP path withdrawal message identifies an existing BGP path to be deleted by a receiving BGP speaker.

In BGP networks, it is increasingly common to deploy multiple redundant RRs/RSs in an active/active mode (i.e., a mode where all RRs/RSs receive and forward BGP paths from/to client BGP speakers at the same time) in order to increase the resiliency of the network. Accordingly, RR/RS 104(1) and RR/RS 104(2) of FIG. 1 are assumed to be redundant RRs/RSs that operate in this manner. To clarify this, consider a scenario in which BGP speaker 102(1) has 100 BGP paths to be advertised to other BGP speakers, where the 100 BGP paths correspond to the following address prefix→next-hop mappings (note that BGP is designed to handle multiple address families (IPv4, IPv6, EVPN, IP VPN, etc.); IPv4 addresses are used in the example below and throughout the document for illustration purposes, but IPv6 addresses can be used interchangeably):

1.0.0.1/16→NH1

2.0.0.1/16→NH2

3.0.0.1/16→NH3

. . . .

100.0.0.1/16→NH100

Listing 1

In this scenario, BGP speaker 102(1) will send a set of BGP path update messages for the 100 BGP paths to RR/RS 104(1) and an identical set of BGP path update messages for the 100 BGP paths to RR/RS 104(2). Each RR/RS 104 will then forward the BGP path update messages that it receives from BGP speaker 102(1) to BGP speakers 102(2) and 102(3) respectively. The result of this sequence is that BGP speakers 102(2) and 102(3) will each receive 200 BGP path update messages corresponding to the original 100 BGP paths identified in Listing 1-100 messages forwarded by RR/RS 104(1) and another 100 messages forwarded by RR/RS 104(2). This ensures that even if one of RRs/RSs 104(1) or 104(2) goes down, BGP speakers 102(2) and 102(3) will still receive the 100 BGP paths advertised by BGP speaker 102(1) via the other, still-operational RR/RS.

One complication with the foregoing workflow is that, as mentioned in the Background section, BGP speakers are conventionally configured to create and maintain per-peer path databases. Thus, in the example above where BGP speaker 102(1) advertises the 100 BGP paths shown in Listing 1 via RRs/RSs 104(1) and 104(2), the BGP control plane of each receiving BGP speaker 102(2)/102(3) will create and maintain two separate path databases according to this conventional approach: a first path database associated with BGP peer RR/RS 104(1) that holds the 100 BGP paths identified in the BGP path update messages forwarded by RR/RS 104(1), and a second path database associated with BGP peer RR/RS 104(2) that holds the 100 identical BGP paths identified in the BGP path update messages forwarded by RR/RS 104(2). This situation is depicted in FIG. 2 with respect to BGP speaker 102(2)—as shown in this figure, BGP speaker 102(2) includes two path databases 200 and 202 associated with RRs/RSs 104(1) and 104(2) respectively, each of which includes the same set of 100 BGP paths advertised by BGP speaker 102(1).

Figure 2:
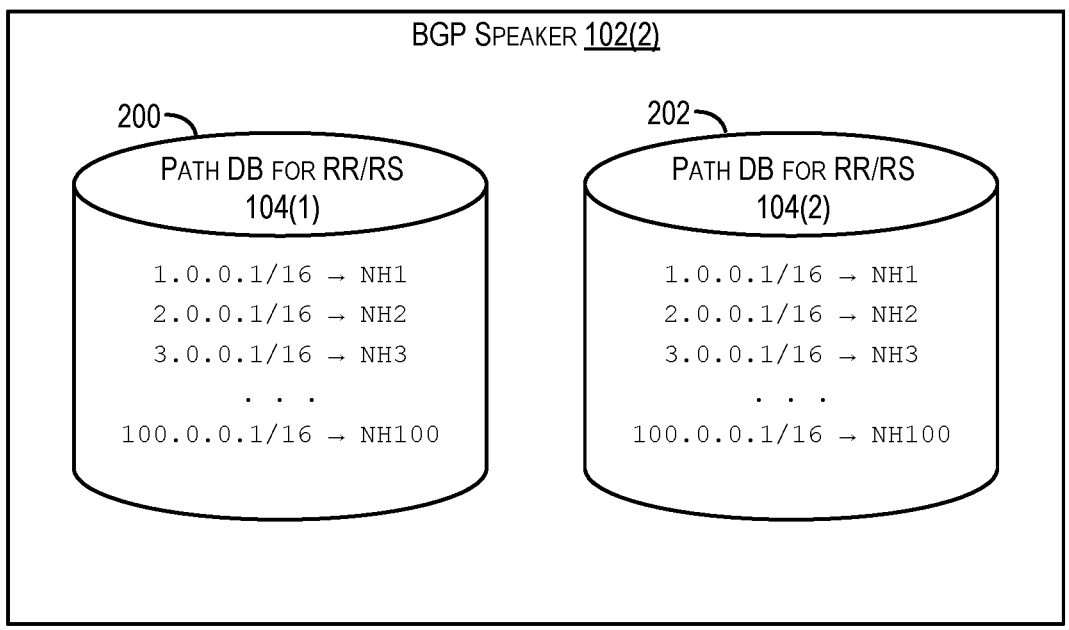
FIG. 2 depicts an example BGP speaker comprising per-peer path databases.

The duplication of BGP paths illustrated in FIG. 2 and described above is problematic for at least two reasons: first, it unnecessarily increases the memory and compute overhead of the BGP control plane on each client BGP speaker in a manner that is proportional to the total number of redundant RRs/RSs. In particular, control plane memory consumption is increased due to the need to create and maintain duplicate BGP path information in the form of a separate path database for each redundant RR/RS peer, and control plane compute usage is increased due to the need to manage the duplicate BGP path information. This makes it difficult to deploy resilient BGP networks with a high degree of RR/RS redundancy, as these memory and compute costs will scale upward for each additional RR/RS that is added to the network.

Second, the maintenance of duplicate path databases on a client BGP speaker can undesirably lengthen the convergence time for BGP path updates/withdrawals, where "convergence time" refers to the time needed for a path update or withdrawal to be reflected in the BGP speaker's next-hop forwarding table. This is because BGP requires that a path update/withdrawal message for a given BGP path P be applied to every path database in which P appears before the update/withdrawal can be propagated to the next-hop forwarding table. Accordingly, if path P appears in N duplicate path databases corresponding to N redundant RR/RS peers, the client BGP speaker must first receive N BGP path update/withdrawal messages for P (one from each RR/RS peer) and apply all N messages to the corresponding per-peer path databases before the path update/withdrawal can take effect. This can significantly delay convergence of the path update/withdrawal event, which in turn can lead to various issues such as data loss/blackholing.

By way of example, assume BGP speaker 102(1) advertises an initial BGP path update message for address prefix 10.0.0.1/16 that maps this prefix to speaker 102(1) because, e.g., speaker 102(1) has a path to the network addresses in this prefix via a particular link L. The BGP path update message will be transmitted to RRs/RSs 104(1) and 104(2) and each RR/RS 104 will forward a copy of the message to BGP speakers 102(2) and 102(3). Per the conventional approach noted earlier, each BGP speaker 102(2)/102(3) will then store the BGP path included in the received messages (i.e., path [10.0.0.1/16→speaker 102(1)]) in two separate path databases—a first path database associated with RR/RS 104(1) and a second path database associated with RR/RS 104(2)—and update its next-hop forwarding table accordingly.

Further assume that BGP speaker 102(1) subsequently advertises a BGP path withdrawal message for withdrawing path [10.0.0.1/16→speaker 102(1)] because link L has gone down and speaker 102(1) no longer has connectivity to the prefix domain 10.0.0.1/16. As before, this BGP update withdrawal message will be transmitted to RRs/RSs 104(1) and 104(2) and each RR/RS 104 will forward a copy of the message to BGP speakers 102(2) and 102(3). However, assume that the withdrawal message forwarded by RR/RS 104(1) to BGP speaker 102(2) is received by speaker 102(2) in a timely manner while the withdrawal message forwarded by RR/RS 104(2) to BGP speaker 102(2) is delayed due to, e.g., congestion on the link coupling these two devices or some other reason. In this scenario, path [10.0.0.1/16→speaker 102(1)] will not be deleted from the next-hop forwarding table of BGP speaker 102(2) until speaker 102(2) receives and processes the delayed BGP path withdrawal message from RR/RS 104(2). In the interim, BGP speaker 102(2) may continue forwarding network packets destined for 10.0.0.1/16 to BGP speaker 102(1) per stale path [10.0.0.1/16→speaker 102(1)] in its next-hop forwarding table, in which case the forwarded packets will be dropped (and thus lost or "blackholed") at speaker 102(1) because speaker 102(1) no longer has connectivity to 10.0.0.1/16.

Figure 3:
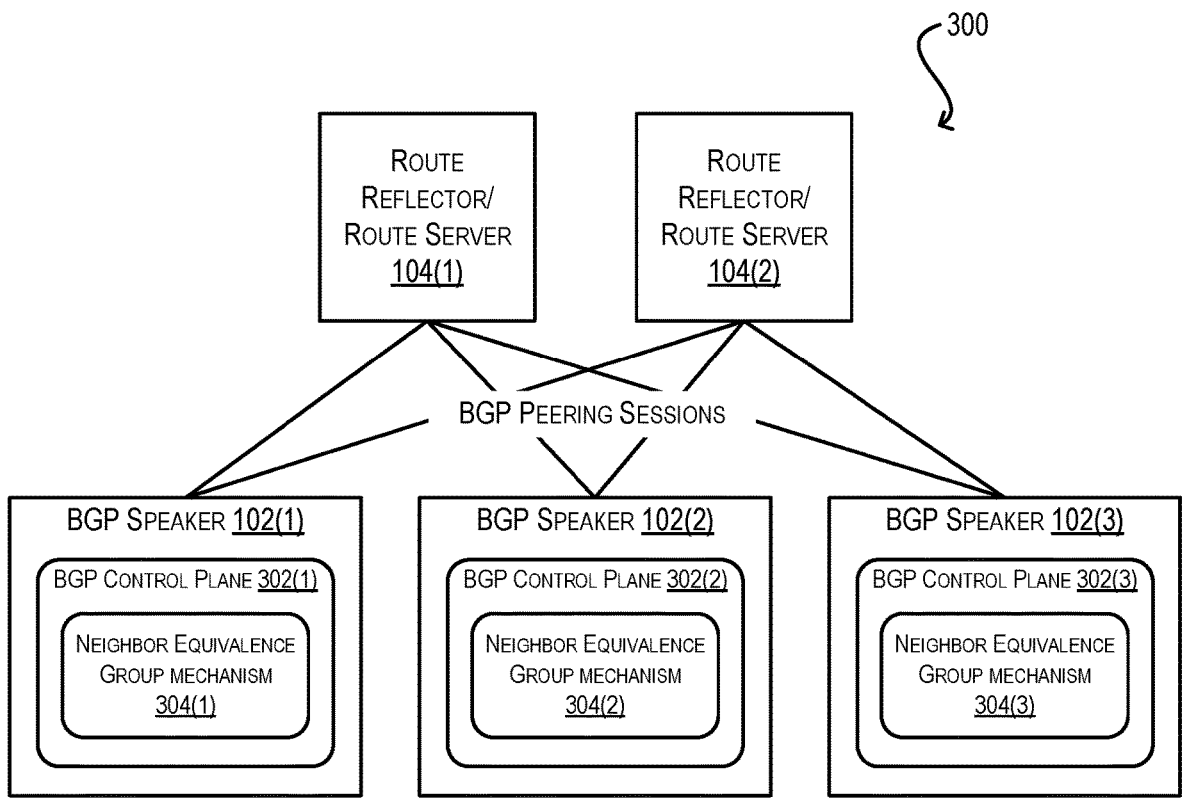
FIG. 3 depicts an enhanced version of the network topology of FIG. 1 according to certain embodiments.

To address the foregoing and other similar problems, FIG. 3 depicts an enhanced version of topology 100 of FIG. 1 (i.e., topology 300) that includes, within BGP control planes 302(1)-(3) of BGP speakers 102(1)-(3) respectively, a novel neighbor equivalence group mechanism 304 according to certain embodiments. At a high level, mechanism 304 can enable each BGP speaker 102 to classify equivalent BGP peers of the speaker as being part of a grouping referred to as a neighbor equivalence group, where "equivalent BGP peers" are BGP peers that advertise the same set of BGP paths to the speaker. For instance, in topology 100/300, RRs/RSs 104(1) and 104(2) advertise identical BGP paths to BGP speakers 102(1)-(3) by virtue of their redundant operation and thus can be classified as being part of a single neighbor equivalence group on each speaker 102 via mechanism 304.

In addition, once a neighbor equivalence group has been configured on a given BGP speaker 102, mechanism 304 can enable the BGP speaker to (A) create/maintain a single path database for storing BGP paths received from all members of the group, and (B) immediately process BGP path update/withdrawal messages received from group members against the single path database, without waiting for the same message to be received from every group member. These features provide several benefits over the conventional approach of creating/maintaining per-peer path databases. For example, feature (A) advantageously reduces the memory and compute overhead of the speaker's BGP control plane because it avoids the need to store and manage duplicate BGP paths per equivalent peer/group member; instead, only a single copy of each unique BGP path received from the group members can be maintained within the single path database for the entire group. This, in turn, facilitates the deployment of highly resilient BGP networks because increasing the number of redundant RRs/RSs in a neighbor equivalence group will not increase BGP control plane memory/compute requirements.

Figure 4:
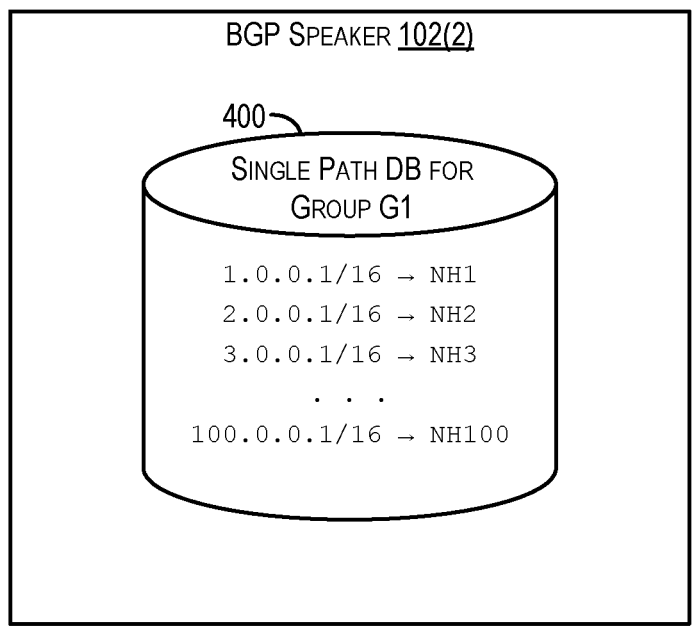
FIG. 4 depicts an example BGP speaker comprising a single path database according to certain embodiments.

To illustrate this, consider a scenario in which RRs/RSs 104(1) and 104(2) are grouped together into a neighbor equivalence group G1 on BGP speaker 102(2) and, subsequent to the definition of group G1, BGP speaker 102(1) advertises the 100 BGP paths identified in Listing 1 to BGP speaker 102(2) via RRs/RSs 104(1) and 104(2). In this scenario, BGP speaker 102(2) will receive 100 BGP paths in update messages received from RR/RS 104(1) and another 100 (identical) BGP paths in update messages received from RR/RS 104(2)) as explained previously. However, rather than creating two separate path databases for RRs/RSs 104(1) and 104(2) that store a combined total of 200 BGP paths as shown in FIG. 2, BGP speaker 102(2) will create a single path database 400 for group G1 (depicted in FIG. 4) that stores only the 100 BGP paths originally advertised by BGP speaker 102(1). Thus, the creation/maintenance of a single path database per neighbor equivalence group enables a BGP speaker to reduce its BGP path count/memory consumption from (N×X) to X, where N is the number of equivalent BGP peers in the neighbor equivalence group and X is the number of BGP paths received from each group member.

Further, feature (B) advantageously results in faster convergence for BGP path updates/withdrawals and thus reduces the likelihood of data loss/blackholing due to long convergence times. For instance, with respect to the previous example where BGP speaker 102(1) advertises path [10.0.0.1/16→speaker 102(1)] and subsequently withdraws it, if RR/RS 104(1) and 104(2) are grouped together into a neighbor equivalence group on BGP speaker 102(2), speaker 102(2) will delete path [10.0.0.1/16→speaker 102(1)] from the group's single path database as soon as it receives a BGP path withdrawal message from either RR/RS 104(1) or RR/RS 104(2). Hence, as long as the withdrawal message is received in a timely fashion from at least one RR/RS, BGP speaker 102(2) will promptly propagate the path deletion to its next-hop forwarding table, thereby avoiding or minimizing the blackholing problem mentioned above.

The following sections provide additional details regarding the implementation of neighbor equivalence group mechanism 304 according to various embodiments, including flowcharts for configuring/establishing neighbor equivalence groups on a BGP speaker and processing BGP path update/withdrawal messages received from group members. It should be appreciated that FIGS. 1-4 are illustrative and not intended to limit embodiments of the present disclosure. For example, although neighbor equivalence group mechanism 304 is shown as being implemented in the context of BGP, as mentioned previously mechanism 304 can be applied to other networking protocols. Thus, the concept of a "neighbor equivalence group" is not strictly limited to a set of BGP peers that advertise the same BGP paths, and instead can be broadly understood as a set of network peers that advertise the same network control plane state to a given network device (whether that state pertains to network routes or other types of control plane objects/information).

Further, although FIGS. 1 and 3 depict a particular BGP network/topology in which neighbor equivalence groups are configured on client BGP speakers with respect to equivalent RR/RS peers, mechanism 304 can also be applied to alternative BGP topologies where, for example, neighbor equivalence groups are configured on RRs/RSs themselves, or where the members of a neighbor equivalence group participate in the network data plane (such as, e.g., spine switches in a data center "leaf-spine" architecture). Examples of these alternative topologies are discussed in section (5) below.

3. Neighbor Equivalence Group Configuration

Figure 5:
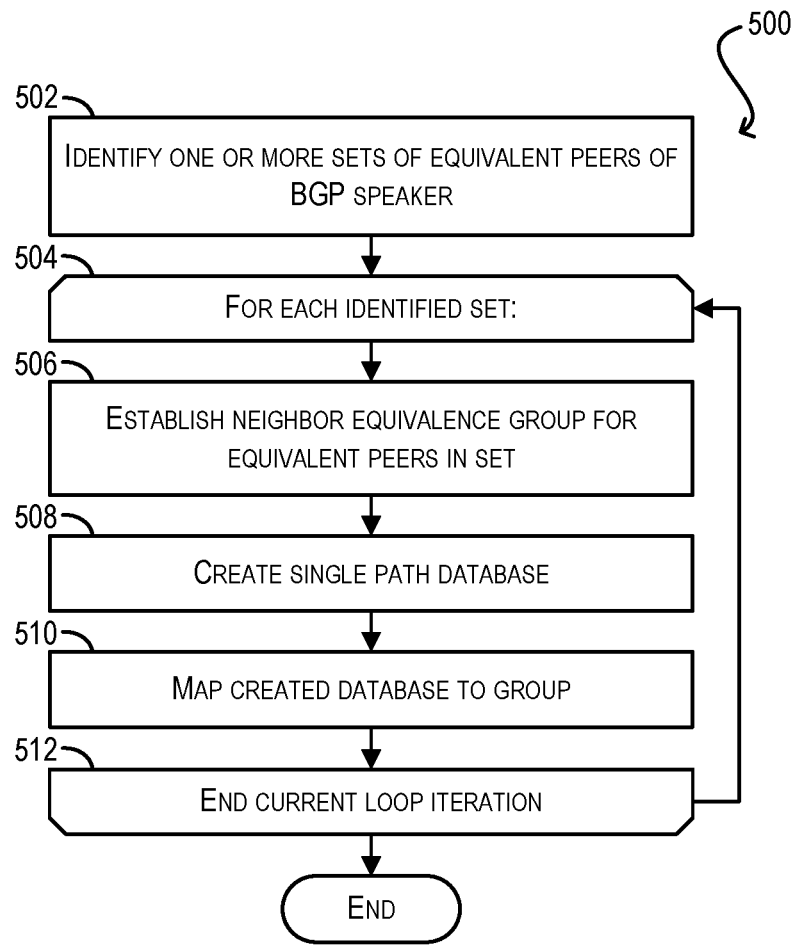
FIG. 5 depicts a flowchart for configuring/establishing neighbor equivalence groups according to certain embodiments.

FIG. 5 depicts a flowchart 500 that can be executed by a BGP speaker (such as, e.g., one of BGP speakers 102(1)-(3) of FIG. 3) for configuring neighbor equivalence groups on the device via mechanism 304 according to certain embodiments. Flowchart 500 can be initiated upon boot-up of the BGP speaker or at other times, such as in response to one or more user-provided commands.

Starting with block 502, the BGP speaker can identify one or more sets of equivalent peers with respect to itself. As mentioned previously, in the context of BGP, a set of equivalent peers for a given BGP speaker S are BGP peers that are configured to advertise the same BGP paths to speaker S, such as redundant RRs/RSs. In the context of other networking protocols, a set of equivalent peers for a given network device D can be understood as network peers of device D (i.e., devices communicatively coupled with D) that are configured to advertise or communicate the same network control plane state to D.

In one set of embodiments, the BGP speaker can perform the identification at block 502 by receiving/retrieving group configuration information provided by a user or administrator of the device via some management interface (e.g., a command line interface (CLI), configuration script, etc.). In other embodiments, the BGP speaker can perform this identification by receiving/retrieving group configuration information stored in a central management repository.

At block 504, the BGP speaker can enter a loop for each equivalent peer set identified at block 502. Within this loop, the BGP speaker can establish a neighbor equivalence group for the equivalent peers included in the current set (block 506). This can involve, e.g., creating a data structure in its working memory that associates each peer with the group.

The BGP speaker can further create a single path database for the entire group (rather than a separate path database for each group member) at block 508 and can map the created database to the group at block 510. Finally, at block 512, the BGP speaker can reach the end of the current loop iteration and return to the top of the loop in order to process additional equivalent peer sets. Once all of the equivalent peer sets identified at block 502 have been processed, the flowchart can end.

It should be appreciated that flowchart 500 is illustrative and various modifications are possible. For example, although flowchart 500 indicates that the BGP speaker creates the single path database for a given neighbor equivalence group upon establishing the group within loop 504, in other embodiments the timing of this database creation step may differ. For instance, in certain embodiments, the BGP speaker may delay creating the single path database until the BGP speaker has established peering sessions with each of the peers in the group. One of ordinary skill in the art will recognize other variations, modifications, and alternatives.

4. Processing BGP Path Update/Withdrawal Messages from Group Members

Figure 6:
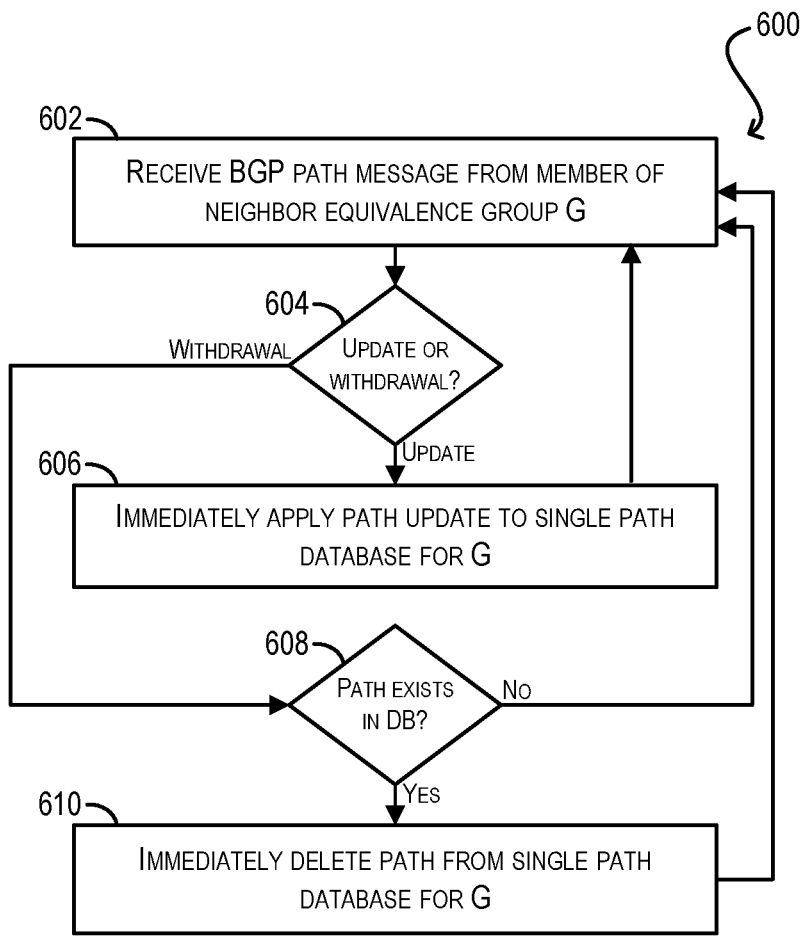
FIG. 6 depicts a flowchart for processing BGP path update/withdrawal messages from members of a neighbor equivalence group according to certain embodiments.

FIG. 6 depicts a flowchart 600 that can be performed by a BGP speaker for processing incoming BGP path update/withdrawal messages from members of a given neighbor equivalence group G via mechanism 304 of FIG. 3 according to certain embodiments. Flowchart 600 assumes that the neighbor equivalence group G has been configured/established on the BGP speaker per flowchart 500 of FIG. 5.

Starting with blocks 602 and 604, the BGP speaker can receive a BGP path message from a member (i.e., equivalent peer) in group G and can determine whether the message pertains to a BGP path update or a BGP path withdrawal. If the message pertains to a BGP path update, the BGP speaker can immediately apply the update to an entry in the single path database created for group G (per block 508 of flowchart 500) that corresponds to the key (i.e., address prefix) for the BGP path identified in the update message (block 606). For example, if the update message includes the address prefix-to-next hop mapping 10.0.1.0/24→NH1, the BGP speaker can update the path entry in the single path database corresponding to key/address prefix "10.0.1.0/24" with the new/updated next hop "NH1." The BGP speaker can then return to block 602 in order to process additional incoming messages.

Note that for a given update to a BGP path P, the BGP speaker will receive the same update message for P from every equivalent peer in the group. Thus, with the processing at block 606, the BGP speaker will update/create the entry for P in group G's single path database upon receiving the very first update message for P from any peer in the group (or in other words, without having to wait for all of the duplicate update messages for P to be received). This ensures that the update of path P is reflected in the BGP speaker's next-hop forwarding table as soon as possible. Any duplicate update messages that are received for path P after that initial update message will simply overwrite the entry for P in the single path database, which will cause no changes to the path.

Returning to block 604 of flowchart 600, if the BGP speaker determines that the received BGP path message pertains to a path withdrawal rather than a path update, the BGP speaker can further check whether the path exists in the single path database for group G (block 608). If the answer is no, no action needs to be taken and the BGP speaker can return to block 602 in order to process additional incoming messages. Otherwise, the BGP speaker can immediately delete that path from the single path database (block 610) and then return to block 602.

As in the update case, for a given withdrawal of a BGP path P, the BGP speaker will receive the same withdrawal message for P from every equivalent peer in group G. Thus, with the processing at blocks 608-610, the BGP speaker will delete P from group G's single path database upon receiving the very first withdrawal message for P from any peer in the group (or in other words, without having to wait for all of the duplicate withdrawal messages for P to be received). This ensures that the withdrawal of path P is reflected in the BGP speaker's next-hop forwarding table as soon as possible. Once path P is deleted from the single path database at block 610, any duplicate withdrawal messages received for path P after the initial withdrawal message will simply cause the BGP speaker to take no action per block 608.

Although not shown in flowchart 600, in certain embodiments if the BGP speaker detects that one or more members in group G has become unavailable (via, e.g., expiration of the BGP hold-down timer, a TCP (Transmission Control Protocol) session timeout, or a BFD (Bi-directional Forwarding Detection) session timeout), the BGP speaker can maintain the group's single path database as long as at least one group member remains alive/reachable. This ensures that the BGP speaker can continue to track BGP paths for the live peer. To facilitate BGP graceful restart functionality, if all of the members of group G go offline and are restarted, the BGP speaker can, upon receiving an "End-Of-Rib" (EOR) message from any of the group members post-restart, delete any existing paths in the single path database that have not been refreshed before receiving the EOR message.

To clarify the above, consider a scenario in which the BGP speaker detects that one or more members in group G have gone offline while at least one member in group G remains alive/reachable. In this case, the BGP speaker will maintain its single path database for group G and, when the offline group member(s) are restarted, each such member will collect BGP path advertisements (i.e., path messages)

from its peers and forward these advertisements to the BGP speaker (in addition to other client BGP speakers). Upon receiving these forwarded advertisements, the BGP speaker will refresh the paths in its single path database with the path information included in the advertisements. In this scenario, the BGP speaker will not take any action with respect to EOR messages received from the restarted group members; if the single path database includes "stale" paths that are not refreshed via the advertisements forwarded by the restarted group members, those state paths will eventually be deleted via BGP withdrawal messages transmitted by the live group members.

On the other hand, consider a scenario in which all of the members of group G go offline and are subsequently restarted. In this case, each restarted group member will forward BGP advertisements to the BGP speaker, which will refresh its single path database for group G using the received advertisements as mentioned above. However, upon receiving the first EOR message from any of the restarted members, the BGP speaker will process the EOR message and delete any stale paths in the single path database that were not refreshed via the forwarded advertisements. Any further EOR messages received by the BGP speaker will be ignored.

Further, in various embodiments BGP speaker can apply any inbound BGP path policies that are defined with respect to one or more members of group G to the group as a whole. In these embodiments, the application or re-application of a path policy can result in modification of the BGP paths included in the single path database for the group.

5. Alternative Topologies

As mentioned earlier, the techniques of the present disclosure may be applied to a variety of different BGP networks/topologies beyond topology 100/300 shown in FIG. 1/3. The sub-sections below describe two such alternative topologies and how neighbor equivalence groups may be implemented in each one.

5.1 Data Center Interconnection Topology

Figure 7:
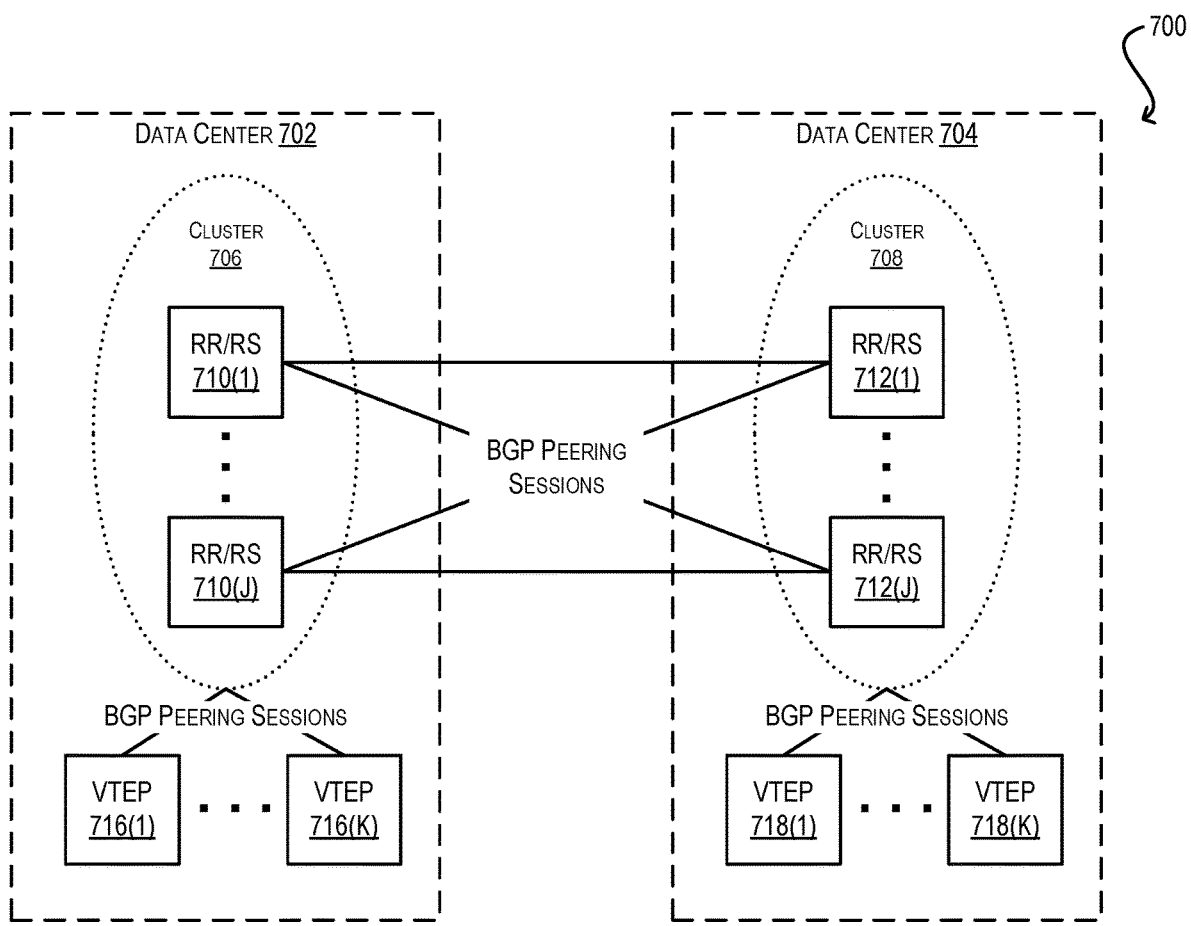
FIG. 7 depicts an example data center interconnection topology according to certain embodiments.

FIG. 7 depicts an example data center interconnection topology 700 comprising two data centers 702 and 704 according to certain embodiments. Each data center 702/704 includes a cluster 706/708 of J redundant RRs/RRs (710(1)-(J) and 712(1)-(J) respectively). The redundant RRs/RSs in these clusters are peered with each other according to a full mesh in order to interconnect the two data centers in a reliable fashion. In addition, each data center 702/704 includes a number of internal BGP speakers (referred to as virtual tunnel end points, or VTEPs) 716(1)-(K)/718(1)-(K) that are clients of the RR/RSs in clusters 706 and 708 respectively.

Assume that there are X unique BGP paths to be advertised by the RRs/RSs in cluster 706 of data center 702 and Y unique BGP paths to be advertised by the RRs/RSs in cluster 708 of data center 704. In this case, if all devices shown in topology 700 implement the conventional approach of creating and maintaining separate path databases for the BGP paths received from connected peers, each RR/RS 712 in cluster 708 will need store X×J paths received from the RRs/RSs in cluster 706 (X paths per RR/RS 710), and each RR/RS 710 in cluster 706 will need to store Y×J paths received from the RRs/RSs in cluster 708 (Y paths per RR/RS 712). Further, each VTEP 718 in data center 704 will need to store (Y×J)+(X×J) paths received from the RRs/RSs in cluster 708 (which includes the paths originating from the RRs/RSs in cluster 706), and each VTEP in data center 702 will need to store (X×J)+(Y×J) paths received from the RRs/RSs in cluster 708 (which includes the paths originating from the RRs/RSs in cluster 708). As can be imagined, these path counts will grow quickly as X, Y, and J are scaled upward, resulting in a high degree of memory and compute overhead on the BGP control planes of the devices in the topology.

To address this, the neighbor equivalence group mechanism described in the foregoing sections can be implemented on each of the RRs/RSs 710 and 712 in clusters 706 and 708, as well as on each of the VTEPs 716 and 718 in data centers 702 and 708. In particular, (1) for each RR/RS 710, a neighbor equivalence group can be configured that includes BGP peers RRs/RSs 712(1)-(J), (2) for each RR/RS 712, a neighbor equivalence group can be configured that includes BGP peers RRs/RSs 710(1)-(J); (3) for each VTEP 716, a neighbor equivalence group can be configured that includes BGP peers RRs/RSs 710(1)-(J), and (4) for each VTEP 718, a neighbor equivalence group can be configured that includes BGP peers RRs/RSs 712(1)-(J). With this configuration in place, the number of BGP paths stored on each RR/RS 710 and 712 can be reduced to Y and X respectively, and the number of BGP paths stored on each VTEP 716 and 718 can be reduced to Y+X.

5.2 Data Center Leaf Spine Topology

Figure 8:
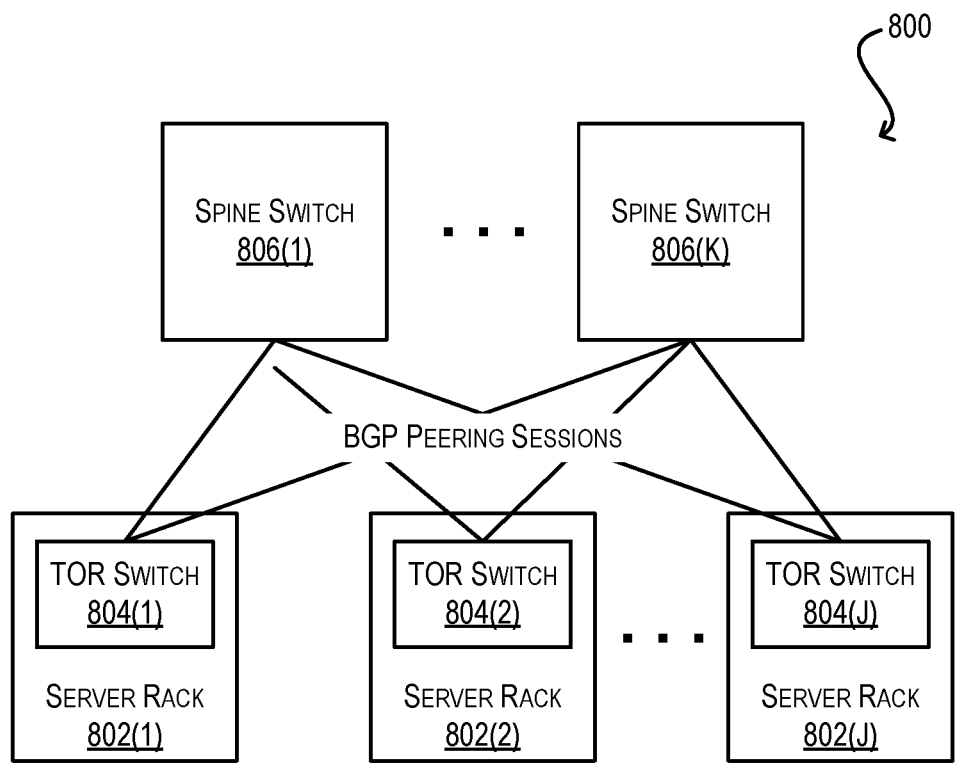
FIG. 8 depicts an example data center leaf spine topology according to certain embodiments.

FIG. 8 depicts an example data center leaf spine topology 800 according to certain embodiments. As shown, topology 800 includes J server racks 802(1)-(J) that each include a TOR (top-of-rack) switch 804. TOR switches 804(1)-(J) are in turn connected to K spine switches 806(1)-(K). Spine switches 806(1)-(K) are configured to route data traffic between TOR switches 804(1)-(J) and to one or more external networks (e.g., the Internet). Spine switches 806(1)-(K) are also configured to redundantly forward BGP control traffic (i.e., BGP paths) among these entities in a manner that is similar to redundant RRs/RSs 104(1) and 104(2) of FIG. 1/3.

Assume that there are X unique BGP paths to be advertised by TOR switch 804(1) via spine switches 806(1)-(K). In this case, if all of the TOR switches implement the conventional approach of creating and maintaining separate path databases for the BGP paths received from connected peers, each TOR switch 804(2)-(J) will need to store a total of X×K BGP paths (X paths received per spine switch), which limits the scalability of the BGP control planes on these devices.

To address this, the neighbor equivalence group mechanism described in the foregoing sections can be implemented on TOR switches 804(1)-(J) such that, for each TOR switch, a neighbor equivalence group is configured that includes spine switches 806(1)-(K). With this configuration in place, the number of BGP paths stored on each TOR switch 804(2)-(J) can be advantageously reduced to X.

6. Example Network Device

Figure 9:
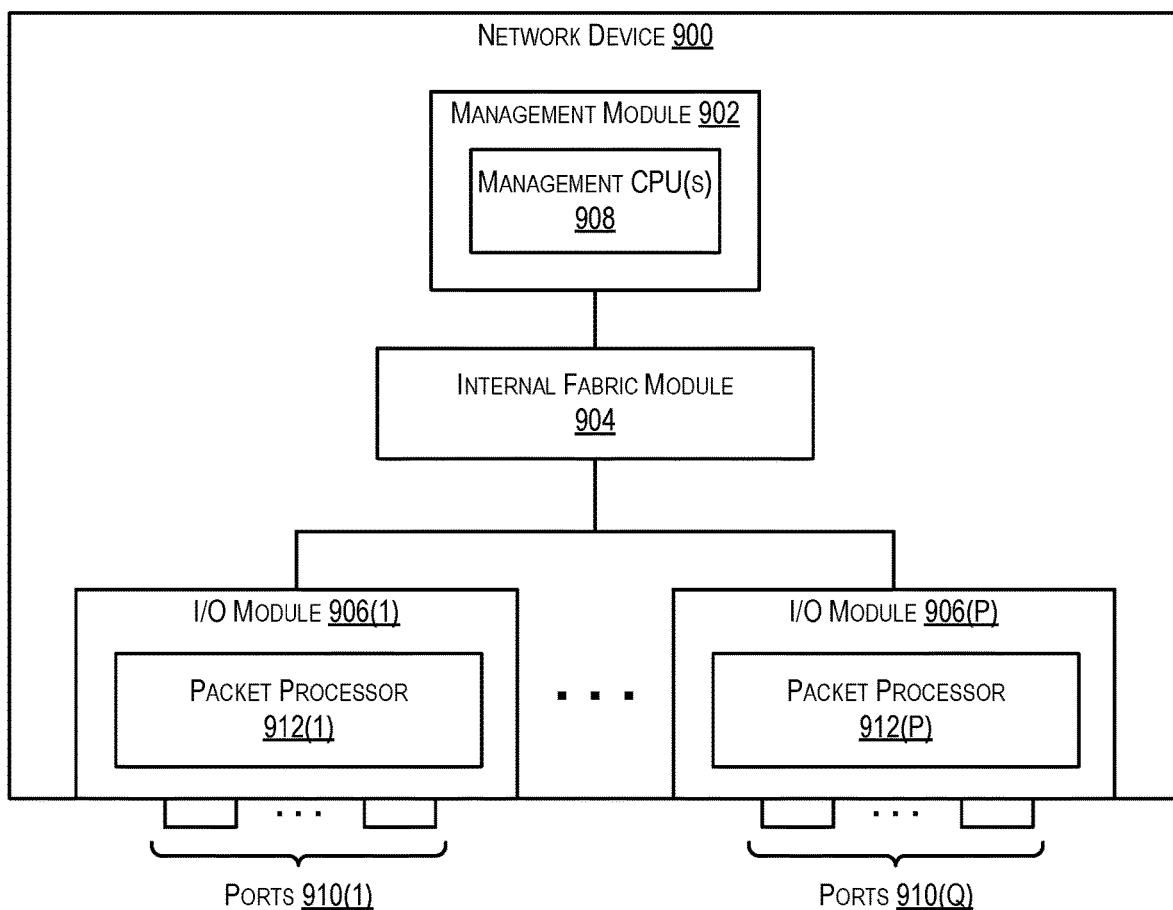
FIG. 9 depicts an example network device according to certain embodiments.

FIG. 9 depicts the architecture of an example network device (e.g., a network switch or router) 900 that may implement the techniques of the present disclosure according to certain embodiments. For example, network device 900 may correspond to any of the BGP speakers or other devices shown in FIG. 1, 3, 7, or 8.

Network device 900 includes a management module 902, an internal fabric module 904, and a number of I/O modules 906(1)-(P). Management module 902 includes one or more management CPUs 908 for managing/controlling the operation of the device. Each management CPU 908 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code (e.g., BGP control plane code) for implementing some or all of the techniques described in the foregoing sections.

Internal fabric module 904 and I/O modules 906(1)-(P) collectively represent the data, or forwarding, plane of network device 900. Internal fabric module 904 is configured to interconnect the various other modules of network device 900. Each I/O module 906 includes one or more input/output ports 910(1)-(Q) that are used by network device 900 to send and receive network packets. Each I/O module 906 can also include a packet processor 912, which is a hardware processing component that can make wire speed decisions on how to handle incoming or outgoing network packets.

It should be appreciated that network device 900 is illustrative and other configurations having more or fewer components than network device 900 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular flowcharts and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a network device, an identical set of BGP path information from each of a plurality of equivalent Border Gateway Protocol (BGP) peers;
   determining, by the network device, that each of the plurality of equivalent BGP peers advertise identical BGP path information to the network device;
   establishing, by the network device, a neighbor equivalence group comprising the plurality of equivalent BGP peers; and
   creating, by the network device, a single path database associated with the neighbor equivalence group, the single path database storing the identical set of BGP path information.

2. The method of claim 1 wherein the network device is a BGP speaker and wherein each of the plurality of equivalent BGP peers is a route reflector or a route server.

3. The method of claim 1 wherein identifying the plurality of equivalent BGP peers comprises participating in a communication exchange with one or more of the equivalent BGP peers.

4. The method of claim 1 further comprising:
   receiving a BGP path update message pertaining to a path P from a first equivalent BGP peer in the plurality of equivalent BGP peers; and
   applying the path update message to an entry corresponding to a key for path P in the single path database associated with the neighbor equivalence group, the applying being performed without waiting for duplicate BGP path update messages pertaining to the key for path P from other equivalent BGP peers in the plurality of equivalent BGP peers.

5. The method of claim 1 further comprising:
   receiving a BGP path withdrawal message pertaining to a path P from a first equivalent BGP peer in the plurality of equivalent BGP peers; and
   checking whether path P already exists in the single path database associated with the neighbor equivalence group.

6. The method of claim 5 wherein if path P does not already exist in the single path database, the method further comprises:
   taking no action with respect to path P.

7. The method of claim 5 wherein if path P already exists in the single path database, the method further comprises:
   deleting path P from the single path database without waiting for duplicate BGP path withdrawal messages pertaining to path P from other equivalent BGP peers in the plurality of equivalent BGP peers.

8. The method of claim 1 further comprising:
   detecting that one or more equivalent BGP peers in the neighbor equivalence group have gone offline while at least one equivalent BGP peer is still reachable; and
   maintaining the single path database while the at least one equivalent BGP peer remains reachable.

9. The method of claim 8 further comprising:
   receiving BGP path messages from the one or more equivalent BGP peers upon being restarted; and
   refreshing one or more paths in the single path database based on the received BGP path messages.

10. The method of claim 9 wherein any EOR (End-of-Rib) messages received from the one or more equivalent BGP peers are ignored.

11. The method of claim 1 further comprising:
    detecting that all equivalent BGP peers in the neighbor equivalence group have gone offline;
    receiving BGP path messages from the equivalent BGP peers upon being restarted;
    refreshing one or more paths in the single path database based on the received BGP path messages; and
    upon receiving a first EOR message from one of the equivalent BGP peers after being restarted, deleting stale paths in the single path database that were not refreshed based on the received BGP path messages.

12. A network device comprising:
    a processor; and a non-transitory computer-readable storage medium have stored thereon program code that, when executed by the processor, causes the processor to:

receiving, by a network device, an identical set of BGP path information from each of a plurality of equivalent Border Gateway Protocol (BGP) peers;

determining, by the network device, that each of the plurality of equivalent BGP peers advertise identical BGP path information to the network device;

group a first BGP peer of the network device and a second BGP peer of the network device into a neighbor equivalence group, the first and second BGP peers being configured to send identical BGP path update and withdrawal messages to the network device;

create a single BGP path database associated with the neighbor equivalence group, the single path database storing the identical set of BGP path information; and upon receiving a BGP path update message from the first BGP peer for a path P, update an entry in the single path database corresponding to a key for path P, the updating being performed prior to receiving an identical BGP path update message from the second BGP peer for path P.

13. The network device of claim 12 wherein the program code further causes the processor to:
upon receiving the identical BGP path update message from the second BGP peer for path P, overwrite the entry in the single path database corresponding to path P.

14. The network device of claim 12 wherein the program code further causes the processor to:
upon receiving a BGP path withdrawal message from the first BGP peer for a path P, delete an entry in the single path database corresponding to path P, the deleting being performed prior to receiving an identical BGP path withdrawal message from the second BGP peer for path P.

15. The network device of claim 12 wherein the program code further causes the processor to:
upon receiving the identical BGP path withdrawal message from the second BGP peer for path P, checking whether the entry still exists in the single path database.

16. The network device of claim 15 wherein the program code further causes the processor to:
if the entry still exists in the single path database, delete the entry.

17. A non-transitory computer readable storage medium having embodied thereon a program, the program being executable by a processor in a network device to perform a method, the method comprising:

receiving identical network control plane state from each of a plurality of equivalent peers;

determining that each of the plurality of equivalent peers of the network device communicate identical network control plane state to the network device;

establishing a neighbor equivalence group comprising the plurality of equivalent peers; and creating a single control plane state database associated with the neighbor equivalence group, the single control plane state database storing the identical network control plane state.

18. The non-transitory computer readable storage medium of claim 17 wherein the network device is a route reflector or route server in a first data center and wherein the plurality of equivalent peers are redundant route reflectors or route servers in a second data center.

19. The non-transitory computer readable storage medium of claim 17 wherein the network device is a BGP speaker is a virtual tunnel end point in a data center and wherein the plurality of equivalent peers are redundant route reflectors or route servers in the data center.

20. The non-transitory computer readable storage medium of claim 17 wherein the network device is a top-of-rack (TOR) switch in a data center and where the plurality of equivalent peers are spine switches in the data center.

* * * * *